United States Patent
Russell

(10) Patent No.: US 10,226,088 B1
(45) Date of Patent: Mar. 12, 2019

(54) PET WASTE DISPOSABLE GLOVE

(71) Applicant: Robert Russell, Carpentersville, IL (US)

(72) Inventor: Robert Russell, Carpentersville, IL (US)

(*) Notice: Subject to any disclaimer, the term of this patent is extended or adjusted under 35 U.S.C. 154(b) by 0 days.

(21) Appl. No.: 15/878,476

(22) Filed: Jan. 24, 2018

Related U.S. Application Data

(60) Provisional application No. 62/478,808, filed on Mar. 30, 2017.

(51) Int. Cl.
*A41D 19/00* (2006.01)
*A01K 23/00* (2006.01)
*E01H 1/12* (2006.01)

(52) U.S. Cl.
CPC ........ *A41D 19/0075* (2013.01); *A01K 23/005* (2013.01); *A41D 19/0003* (2013.01); *E01H 1/1206* (2013.01); *A41D 2400/48* (2013.01); *A41D 2400/52* (2013.01)

(58) Field of Classification Search
CPC ............ E01H 1/1206; E01H 2001/124; A41D 19/0075; A41D 19/0003; A41D 2400/52; A41D 2400/48; A01K 23/005
See application file for complete search history.

(56) References Cited

U.S. PATENT DOCUMENTS

| | | | | |
|---|---|---|---|---|
| 4,677,697 A * | 7/1987 | Hayes | ............... | A41D 19/0068 2/159 |
| 5,961,167 A * | 10/1999 | Gilley | ............... | A41D 19/0068 2/159 |
| 6,116,668 A * | 9/2000 | Carpol | ............... | A41D 19/0075 2/160 |
| 6,511,111 B2 * | 1/2003 | Dooley | ............... | A01K 23/005 2/159 |
| 6,637,035 B1 * | 10/2003 | Brinkmann | ........ | A41D 19/0068 15/227 |
| 2015/0176233 A1 * | 6/2015 | Luhrs | .................... | E01H 1/1206 294/1.3 |

OTHER PUBLICATIONS

International Search Report for International Application No. PCT/US2018/025201 (dated May 10, 2018).

* cited by examiner

*Primary Examiner* — Stephen A Vu
(74) *Attorney, Agent, or Firm* — Matthew M. Googe; Robinson IP Law, PLLC

(57) ABSTRACT

A wearable disposable waste device includes: a body portion including a pocket formed therein; an open end formed in the body portion for receiving a hand of a wearer through the end; a closed end of the body portion that is distal from the open end, the closed end shaped to conform around fingertips of the wearer, the closed end having a middle section and shorter end sections formed on opposing sides of the middle section corresponding to the wearer's first and fifth digits when worn on the hand of the wearer; and a pair of opposing tabs extending from the open end formed in the body portion, the pair of opposing tabs spaced apart such that the middle section of the closed end may fit between the pair of opposing tabs when the closed end is located adjacent to the open end of an adjoining wearable disposable waste device.

13 Claims, 2 Drawing Sheets

PET WASTE DISPOSABLE GLOVE

CROSS-REFERENCE TO RELATED APPLICATION

This application claims priority to U.S. Provisional Patent Application Ser. No. 62/478,808 to Robert Russell, filed on Mar. 30, 2017 and entitled "Easy Glove", the contents of which are incorporated herein by reference in its entirety.

FIELD

This disclosure relates to the field of pet care. More particularly, this disclosure relates to a disposable glove for collecting and disposing of pet waste.

BACKGROUND

Picking up and collecting pet waste is a difficult and messy process. A plastic bag is typically employed to pick up waste using a person's hand. If the waste is loose or otherwise messy, picking up the waste without skin contact may be nearly impossible. This makes the process unsanitary and frustrating for an owner of a pet. Further, people who do not pick up pet waste may be subject to penalties, such as local community fines.

Other various devices exist to aid in the pick-up and collection of pet waste, such devices are typically cumbersome and require a person to carry the device while walking with the pet. For example, various devices may include elongate tools and or scoops to collect pet waste and place the waste in a container. These devices may be bulky and difficult to carry when a pet owner takes their pet on a walk or otherwise follows the pet around to collect pet waste.

What is needed, therefore, is a pet waste disposable glove that is readily worn by a user to collect pet waste and adapted to cleanly dispose of the pet waste after collection.

SUMMARY

The above and other needs are met by a pet waste disposable glove. In a first aspect, a wearable disposable waste device includes: a body portion including a pocket formed within at least one sheet of a disposable material; an open end formed in the body portion for receiving a hand of a wearer through the end and within the pocket formed within the body portion; a closed end of the body portion that is distal from the open end, the closed end shaped to conform around fingertips of the wearer, the closed end having a middle section and shorter end sections formed on opposing sides of the middle section corresponding to the wearer's first and fifth digits when worn on the hand of the wearer; and a pair of opposing tabs extending from the open end formed in the body portion, the pair of opposing tabs spaced apart such that the middle section of the closed end may fit between the pair of opposing tabs when the closed end is located adjacent to the open end of an adjoining wearable disposable waste device.

In one embodiment, the closed end of the body portion is formed into a plurality of parallel finger channels for receiving fingers of the wearer. In another embodiment, the plurality of parallel finger channels are releasably attached to one another.

In yet another embodiment, the plurality of parallel finger channels are releasably attached to one another along perforations in the disposable material between the plurality of parallel finger channels.

In one embodiment, the open end of the body portion is releasably attached to the closed end of the body portion of an adjacent wearable disposable waste device such that the middle section and shorter opposing end sections interlock with the open end and opposing shorter end sections of the adjacent wearable disposable device.

In another embodiment, the body portion is releasably attached to the closed end of the body portion of the adjacent wearable disposable waste device along perforations in the disposable material.

In yet another embodiment, a plurality of the wearable disposable waste devices are releasably attached to one another to form a roll.

In one embodiment, a length of the opposing tabs is approximate to a difference in a length of the middle section and shorter end sections.

In another embodiment, a length of one of the opposing tabs is longer than the other opposing tab.

In a second aspect, a wearable disposable waste device includes: a body portion including a pocket formed within at least one sheet of a disposable material; an open end formed in the body portion for receiving a hand of a wearer through the end and within the pocket formed within the body portion; a closed end of the body portion that is distal from the open end, the closed end shaped to conform around fingertips of the wearer, the closed end having a middle section and shorter end sections formed on opposing sides of the middle section corresponding to the wearer's first and fifth digits when worn on the hand of the wearer; and a pair of opposing tabs extending from the open end formed in the body portion, the pair of opposing tabs spaced apart such that the middle section of the closed end may fit between the pair of opposing tabs when the closed end is located adjacent to the open end of an adjoining wearable disposable waste device. The open end of the body portion is releasably attached to the closed end of the body portion of an adjacent wearable disposable waste device such that the middle section and shorter opposing end sections interlock with the open end and opposing shorter end sections of the adjacent wearable disposable device.

In one embodiment, a plurality of the wearable disposable waste devices are releasably attached to one another to form a roll. In another embodiment, the body portion is releasably attached to the closed end of the body portion of the adjacent wearable disposable waste device along perforations in the disposable material. In yet another embodiment, the closed end of the body portion is formed into a plurality of parallel finger channels for receiving fingers of the wearer.

In a third aspect, a roll of disposable waste devices include: a plurality of removably connected sheets, each sheet having a body portion including a pocket formed within at least one sheet of a disposable material, an open end formed in the body portion for receiving a hand of a wearer through the end and within the pocket formed within the body portion, a closed end of the body portion that is distal from the open end, the closed end shaped to conform around fingertips of the wearer, the closed end having a middle section and shorter end sections formed on opposing sides of the middle section corresponding to the wearer's first and fifth digits when worn on the hand of the wearer, and a pair of opposing tabs extending from the open end formed in the body portion, the pair of opposing tabs spaced apart such that the middle section of the closed end may fit between the pair of opposing tabs when the closed end is located adjacent to the open end of an adjoining wearable disposable waste device. The open end of the body portion is releasably attached to the closed end of the body portion of an adjacent wearable disposable waste device such that the middle section and shorter opposing end sections interlock with the open end and opposing shorter end sections of the adjacent wearable disposable device.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
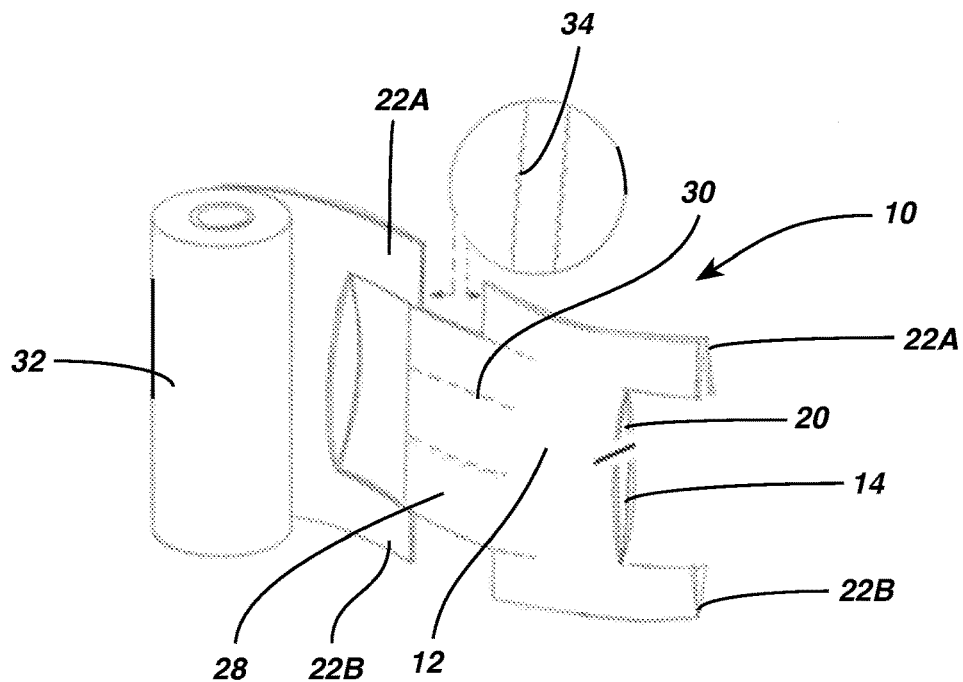
FIG. 1 shows a pet waste disposable glove as part of a roll according to one embodiment of the present disclosure.

FIG. 1 shows a basic embodiment of a pet waste disposable glove 10. The pet waste disposable glove 10 is adapted to be worn on a hand of a user. The pet waste disposable glove 10 advantageously enables a wearer of the device to pick up and dispose of objects, such as pet waste, without requiring the wearer to contact the object. The pet waste disposable glove 10 is formed to be worn by a wearer and discarded after use, and is preferably provided in a roll that includes a plurality of the pet waste disposable gloves 10 that can be worn by the user.

Figure 2:
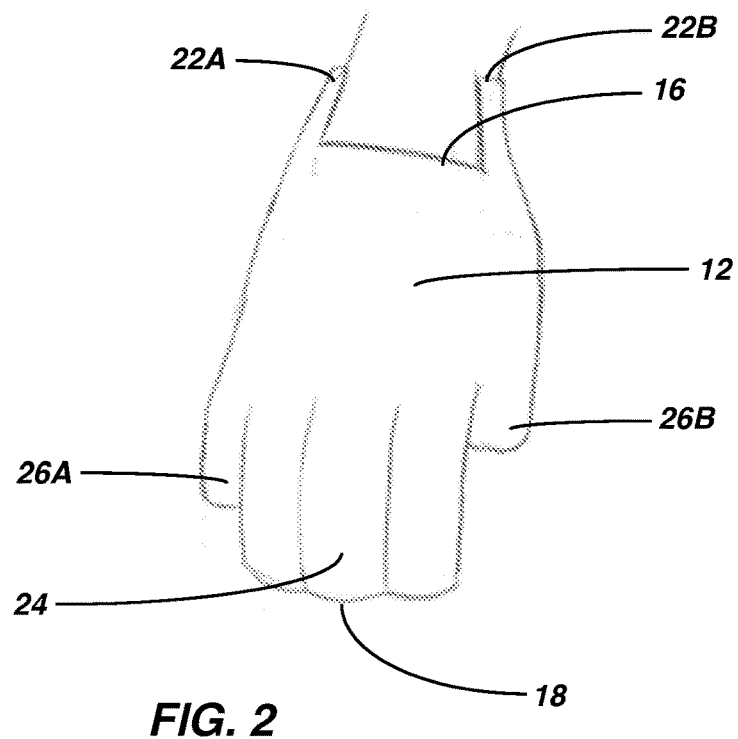
FIG. 2 shows a pet waste disposable glove according to one embodiment of the present disclosure.

As shown in FIGS. 1 and 2, the pet waste disposable glove 10 includes a body portion 12 for receiving a hand of a wearer of the pet waste disposable glove 10. The body portion 12 preferably forms a pocket 14 defined within the body portion 12 for receiving a hand. The body portion 12 is preferably formed of a disposable material, such as a plastic or polymer-based material. The disposable material may further be formed of a biodegradable material such as a water-soluble material. The body portion 12 may be formed of one or more sheets, such as a pair of sheets, that are joined together along edges of the body portion 12. The body portion 12 preferably includes a first end 16 and a second end 18 that is distal from the first end 16 of the body portion 12.

An opening 20 is preferably formed in the first end 16 of the body portion 12 for receiving the hand of a wearer through the opening 20 and into the pocket 14 defined within the body portion 12 of the pet waste disposable glove 10. The opening 20 preferably has a width such that a hand may be accommodated through the opening 20 and into the body portion 12.

A pair of opposing tabs 22A and 22B are formed on opposing sides of the opening 20 of the first end 16 of the body portion 12. The opposing tabs 22A and 22B preferably extend parallel to one another from first end 16 of the body portion 12. The opposing tabs 22A and 22B form a gap between the opposing tabs 22A and 22B such that the second end 18 of an adjacent pet waste disposable glove 10 is shaped to fit with the opposing tabs 22A and 22B and the first end 16, as described in greater detail below.

The second end 18 is closed and is preferably shaped to receive fingers of the wearer's hand. The second end 18 includes a middle portion 24 and opposing outer portions 26A and 26B. The middle portion 24 preferably has a length that is greater than a length of the opposing outer portions 26A and 26. The middle portion 24 is preferably shaped to conform around middle digits of the hand, while the opposing outer portions 26A and 26B are shaped to conform to outer digits of the hand.

Referring again to FIG. 1, closed second end 18 is preferably shaped to receive fingers of a wearer's hand. In one embodiment, the second end 18 may be formed into a plurality of closed channels 28 that are shaped to receive individual fingers of the wearer's hand. The plurality of closed channels 28 may be separably attached to one another along a plurality of perforations 30 formed between each of the channels 28. While FIG. 1 illustrates the second end 18 formed into a plurality of channels 28, it is also understood that the second end may be formed into an end that is open between fingers of the wearer's hand, such that the pet waste disposable glove 10 is similar in shape to a mitt worn around the wearer's hand. When the second end is formed as a mitt, the second end is preferably shaped to receive a plurality of the wearer's fingers within the same portion of the second end such that the wearer's fingers are in contact with one another.

With continued reference to FIG. 1, the pet waste disposable glove 10 is preferably provided as part of a roll 32 that includes a plurality of pet waste disposable gloves. A plurality of the pet waste disposable gloves 10 preferably fit within adjacent of the pet waste disposable gloves 10 between the first end 16 of a first glove and the second end 18 of a second adjacent glove. The longer middle portion 24 is shaped to fit between opposing tabs 22A and 22B of an adjoining pet waste disposable glove 10 such that the second end 18 abuts the first end 16 of an adjoining glove. Further, the outer portions 26A and 26B are shaped to abut ends of the pair of opposing tabs 22A and 22B. When a first of the pet waste disposable glove 10 is joined with an adjacent glove, a continuous sheet is formed and each of the pet waste disposable gloves 10 is readily removed for use without requiring excess material that is not used as part of the pet waste disposable glove 10.

When joined together in the roll 32, each of the plurality of pet waste disposable gloves 10 is preferably joined with an adjacent glove along perforations 34 formed between the first end 16 of a first glove and the second end 18 of a second glove.

Figure 3:
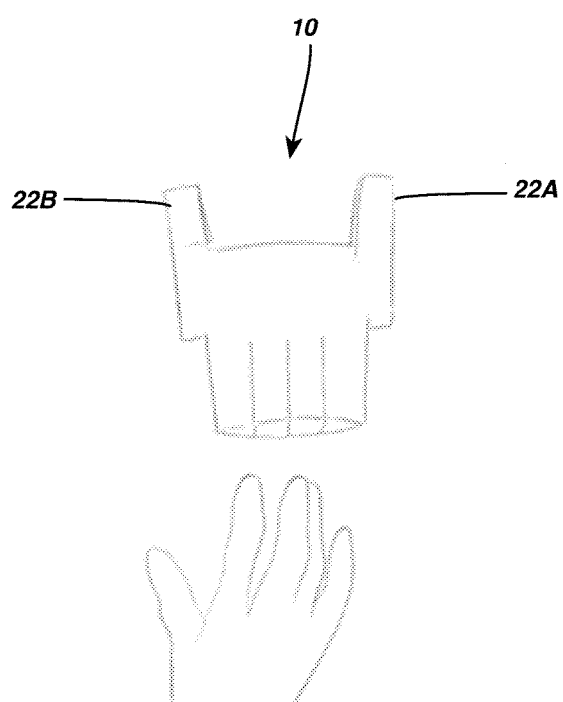
FIG. 3 shows a pet waste disposable glove being removed from a hand of a wearer according to one embodiment of the present disclosure.
Figure 4:
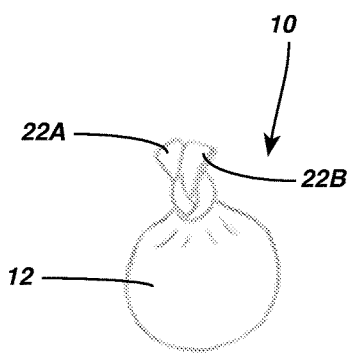
FIG. 4 shows a pet waste disposable glove tied together using opposing tabs according to one embodiment of the present disclosure.

In use, a wearer of the pet waste disposable glove 10 may detach one of the pet waste disposable gloves 10 from the roll 32 and insert a hand into the pet waste disposable glove 10, as shown in FIG. 2. The wearer may then pick up an object, preferably pet waste, using the body portion 12 of the pet waste disposable glove to protect the wearer's hand. After picking up the pet waste, the wearer may pull the pet waste disposable glove 10 off of the hand using one of the opposing tabs 22A and 22B such that the pet waste disposable glove 10 becomes inverted, as shown in FIG. 3. The pet waste is subsequently trapped within the inverted pet waste disposable glove 10. The user may then tie the opposing tabs 22A and 22B together such that the pet waste is contained within the body portion 12 of the pet waste disposable glove 10 for subsequent disposal.

The pet waste disposable glove 10 advantageously allows a user to protect the hand from contact with pet waste while providing dexterity of the wearer to be able to collect all of the pet waste within the pet waste disposable glove 10. Further, the pet waste disposable glove 10 is shaped to fit with adjacent pet shaped disposable gloves along the roll 32 without requiring the wearer to remove excess material, thereby preventing excess material from being wasted.

The pet waste disposable glove 10 described herein may also be suitable for various other uses. For example, embodiments of a disposable glove may be provided in a box or other similar container for use with food or for medical purposes. The opposing tabs 22A and 22B allow the disposable glove to be easily removed and discarded in various other applications.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A wearable disposable waste device comprising:
   a body portion including a pocket formed within at least one sheet of a disposable material;
   an open end formed in the body portion for receiving a hand of a wearer through the open end and within the pocket formed within the body portion;
   a closed end of the body portion that is distal from the open end, the closed end shaped to conform around fingertips of the wearer, the closed end having a middle section and shorter end sections formed on opposing sides of the middle section corresponding to the wearer's first and fifth digits when worn on the hand of the wearer; and
   a pair of opposing tabs extending from the open end formed in the body portion, the pair of opposing tabs spaced apart such that the middle section of the closed end may fit between the pair of opposing tabs and the end sections abut ends of the pair of opposing tabs when the closed end is located adjacent to the open end of an adjoining wearable disposable waste device;
   wherein when the wearable disposable waste device is joined with the adjacent wearable disposable waste device, the middle section and shorter end section fit adjacent to a pair of opposing tabs of the adjacent wearable disposable waste device such that the wearable disposable waste device and adjacent wearable disposable waste device form a continuous sheet without excess unused material;
   wherein a length of the opposing tabs is approximate to a difference in a length of the middle section and shorter end sections.

2. The wearable disposable waste device of claim 1, wherein the closed end of the body portion is formed into a plurality of parallel finger channels for receiving fingers of the wearer.

3. The wearable disposable waste device of claim 2, wherein the plurality of parallel finger channels are releasably attached to one another.

4. The wearable disposable waste device of claim 3, wherein the plurality of parallel finger channels are releasably attached to one another along perforations in the disposable material between the plurality of parallel finger channels.

5. The wearable disposable waste device of claim 1, wherein the open end of the body portion is releasably attached to the closed end of the body portion of an adjacent wearable disposable waste device such that the middle section and shorter opposing end sections interlock with the open end and opposing shorter end sections of the adjacent wearable disposable device.

6. The wearable disposable waste device of claim 5, wherein the body portion is releasably attached to the closed end of the body portion of the adjacent wearable disposable waste device along perforations in the disposable material.

7. The wearable disposable waste device of claim 5, wherein a plurality of the wearable disposable waste devices are releasably attached to one another to form a roll without excess material.

8. The wearable disposable waste device of claim 1, wherein a length of one of the opposing tabs is longer than the other opposing tab.

9. A wearable disposable waste device comprising:
   a body portion including a pocket formed within at least one sheet of a disposable material;
   an open end formed in the body portion for receiving a hand of a wearer through the open end and within the pocket formed within the body portion;
   a closed end of the body portion that is distal from the open end, the closed end shaped to conform around fingertips of the wearer, the closed end having a middle section and shorter end sections formed on opposing sides of the middle section corresponding to the wearer's first and fifth digits when worn on the hand of the wearer; and
   a pair of opposing tabs extending from the open end formed in the body portion, the pair of opposing tabs spaced apart such that the middle section of the closed end may fit between the pair of opposing tabs and the end sections abut ends of the pair of opposing tabs when the closed end is located adjacent to the open end of an adjoining wearable disposable waste device;
   wherein when the wearable disposable waste device is joined with the adjacent wearable disposable waste device, the middle section and shorter end section fit adjacent to a pair of opposing tabs of the adjacent wearable disposable waste device such that the wearable disposable waste device and adjacent wearable disposable waste device form a continuous sheet without excess unused material; and
   wherein the open end of the body portion is releasably attached to the closed end of the body portion of an adjacent wearable disposable waste device such that the middle section and shorter opposing end sections interlock with the open end and opposing shorter end sections of the adjacent wearable disposable device;
   wherein a length of the opposing tabs is approximate to a difference in a length of the middle section and shorter end sections.

10. The wearable disposable waste device of claim 9, wherein a plurality of the wearable disposable waste devices are releasably attached to one another to form a roll.

11. The wearable disposable waste device of claim 10, wherein the body portion is releasably attached to the closed end of the body portion of the adjacent wearable disposable waste device along perforations in the disposable material.

12. The wearable disposable waste device of claim 9, wherein the closed end of the body portion is formed into a plurality of parallel finger channels for receiving fingers of the wearer.

13. A roll of disposable waste devices comprising:
  a plurality of removably connected sheets, each sheet having a body portion including a pocket formed within at least one sheet of a disposable material;
  an open end formed in the body portion for receiving a hand of a wearer through the open end and within the pocket formed within the body portion;
  a closed end of the body portion that is distal from the open end, the closed end shaped to conform around fingertips of the wearer, the closed end having a middle section and shorter end sections formed on opposing sides of the middle section corresponding to the wearer's first and fifth digits when worn on the hand of the wearer; and
  a pair of opposing tabs extending from the open end formed in the body portion, the pair of opposing tabs spaced apart such that the middle section of the closed end may fit between the pair of opposing tabs and the end sections abut ends of the pair of opposing tabs when the closed end is located adjacent to the open end of an adjoining wearable disposable waste device;
  wherein when the wearable disposable waste device is joined with the adjacent wearable disposable waste device, the middle section and shorter end section fit adjacent to a pair of opposing tabs of the adjacent wearable disposable waste device such that the wearable disposable waste device and adjacent wearable disposable waste device form a continuous sheet without excess unused material; and
  wherein the open end of the body portion is releasably attached to the closed end of the body portion of an adjacent wearable disposable waste device such that the middle section and shorter opposing end sections interlock with the open end and opposing shorter end sections of the adjacent wearable disposable device;
  wherein a length of the opposing tabs is approximate to a difference in a length of the middle section and shorter end sections.

* * * * *